United States Patent [19]
Basora et al.

[11] Patent Number: 5,896,812
[45] Date of Patent: Apr. 27, 1999

[54] FRUIT OR VEGETABLE JUICER

[75] Inventors: Sanjuan Antonio Basora; Albert Ferrer, both of Barcelone, Spain

[73] Assignee: Moulinex Espana S.A., Barcelona, Spain

[21] Appl. No.: 09/022,278

[22] Filed: Feb. 11, 1998

[30] Foreign Application Priority Data

Feb. 11, 1997 [FR] France .................................. 97 01571

[51] Int. Cl.⁶ .............................. A23N 1/02; A47J 19/02
[52] U.S. Cl. .................................. 99/511; 99/492; 99/513
[58] Field of Search ..................... 99/495, 492, 509–513,
99/484, 536, 537; 210/360.1, 380.1, 369;
241/37.5, 92, 282.1, 282.2; 366/314, 601;
494/36, 37, 43, 85, 47, 10

[56] References Cited

U.S. PATENT DOCUMENTS

| | | | |
|---|---|---|---|
| 2,325,779 | 8/1943 | Kraber | 99/512 |
| 2,844,176 | 7/1958 | Barrows et al. | 99/512 X |
| 4,183,293 | 1/1980 | Arao et al. | 99/513 X |
| 4,700,621 | 10/1987 | Elger | 99/511 |
| 5,222,430 | 6/1993 | Wang | 241/92 X |
| 5,257,575 | 11/1993 | Harrison et al. | 99/511 |
| 5,392,699 | 2/1995 | Tai | 99/492 |
| 5,433,144 | 7/1995 | Lee | 99/512 |
| 5,479,851 | 1/1996 | McClean et al. | 210/360.1 X |
| 5,669,289 | 9/1997 | Chen | 99/511 |
| 5,669,292 | 9/1997 | Chen | 99/512 |

*Primary Examiner*—Timothy F. Simone
*Attorney, Agent, or Firm*—Young & Thompson

[57] ABSTRACT

A fruit or vegetable juicer comprises a housing enclosing a motor group having an output shaft which projects into a basin secured to the housing. The output shaft drives a working tool disposed in a bowl in rotation. The bowl is movably mounted within the basin and is covered by a cover having a chute for the introduction of foodstuff, and a locking/unlocking device ensures maintenance of the bowl and the basin when the cover is in a locked condition. The bowl and the cover also comprise mutual hooking elements which permit the extraction from the basin of an assembly comprised of the bowl, the working tool and the cover, when the cover is in an unlocked condition.

11 Claims, 3 Drawing Sheets

FRUIT OR VEGETABLE JUICER

CROSS REFERENCE TO RELATED APPLICATION

This application corresponds to French application 97/01571 of Feb. 11, 1997, the disclosure of which is incorporated herein by reference.

FIELD OF THE INVENTION

The invention relates to fruit or vegetable juicers comprising a housing enclosing a motor group whose output shaft extends along an axis X—X', and projects into a basin secured to the housing and drives in rotation a working tool disposed in a bowl mounted removably in said recess and covered by a cover provided with a chute for introduction of foodstuffs and with a locking/unlocking device ensuring maintenance of the bowl in the recess when the cover is in its locked state.

BACKGROUND OF THE INVENTION

A juicer of this type has been described for example in French patent application No. 96/01514, filed Feb. 9, 1995, and in which the cover is maintained on the bowl by means of a locking/unlocking device. Thus, after the operation of unlocking the cover, the user proceeds first to remove this cover, then to withdraw the working tool which must be handled with care, and finally to remove the bowl. These various manipulations not only are delicate but also carry the risk of damaging the working tool which is generally a fragile filter made of ultrafine metal.

SUMMARY OF THE INVENTION

The invention particularly has for its object to overcome these drawbacks and to provide a juicer which will be rapid, safe and convenient to handle.

According to the invention, the bowl and the cover comprise moreover mutual engaging means permitting the extraction from the recess of the assembly formed by the bowl, the working tool and the cover, when said cover is in its unlocked condition.

Thus, the user proceeds, after the unlocking operation, simply to remove the assembly forming a box which he can place without taking precautions, on a working plane, or else move it to the sink without risk of spilling pulp or juice. It will also be understood that this assembly protects the filter from shocks and stresses that the user could impose on it.

According to another characteristic of the invention, the housing has a tubular shape in which the lower region comprises a motor group and the upper region carries the basin whose upper edge has a flange that engages with the upper edge of the housing, said basin and the housing having in their upper region registering openings for discharging the pulp from the bowl, and the lower regions of the basin and middle regions of the housing have registering openings for reception of an outlet spout for juice, disposed in the bottom of the bowl.

Thus this arrangement permits obtaining a simple and low cost construction by mass production because it suffices to stack and interfit the different pieces, which construction facilitates the assembly of the box. Moreover, this arrangement permits obtaining an agreeable appearance.

BRIEF DESCRIPTION OF THE DRAWINGS

The characteristics and advantages of the invention will be further apparent from the description which follows, by way of non-limiting example, with reference to the accompanying drawings, in which.

DETAILED DESCRIPTION OF THE INVENTION

Figure 1:
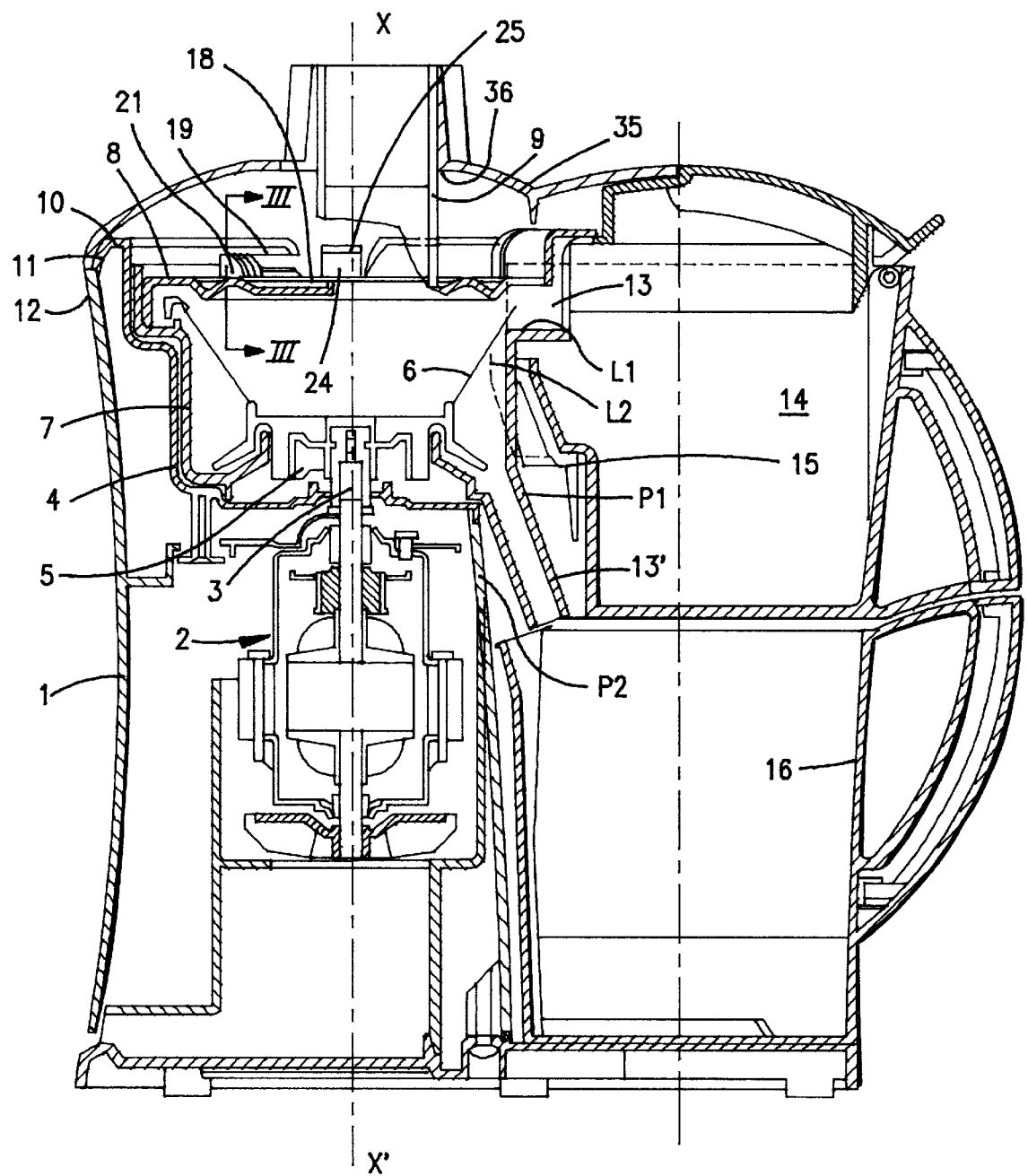
FIG. 1 is a vertical cross-sectional view showing a juicer according to the invention and in which a portion of an inlet chute for foodstuffs has been broken away to show the mutual securement means forming a portion of the invention.

The fruit or vegetable juicer shown in FIG. 1 comprises a housing 1 enclosing a motor group 2 whose output shaft 3 extends along an axis X—X', and projects into a cylindrical basin 4 secured to the housing 1 and drives in rotation, by means of a removable coupling device 5, a working tool 6, such as a metallic filter of inverted truncated conical shape, disposed in a cylindrical bowl 7 also mounted removably in the basin 4 and covered by a cover 8 provided with a chute 9 for introduction of foodstuffs. As shown, the housing 1 has a tubular shape molded in one piece, in which the lower region comprises a motor group 2 and the upper region fixedly carries the basin 4 whose upper edge 10 has a flange 11 coming into engagement with the upper edge 12 of the housing 1.

Moreover, the cover 8 is provided with a locking/unlocking device, relative to the housing, ensuring the maintenance of the bowl 7 in the basin 4 when the cover is in its locked condition. The housing 1 is substantially of monoblock construction and is so arranged that the basin 4 and the housing 1 have in their upper region registering openings L1, L2 for the passage of a pulp outlet 13 provided in the bowl 7, and in the lower regions of the basin 4 and intermediate regions of the housing, registering openings P1, P2 for the passage of an outlet spout 13' for juice, disposed in the bottom of the bowl 7.

Opposite the openings L1, L2 is arranged a pulp receptacle 14 which hooks onto a projection 15 carried by the basin 4 and projects through the opening L2. Below the chute 13' is arranged laterally of the housing 1 a juice vat 16. Thus the pulp receptacle 14 overlies the juice vat 16 and forms a practical and attractive assembly for serving the juice obtained.

According to an important characteristic of the invention, the bowl 7 and the cover 8 comprise moreover mutual hooking means shown together by 17, permitting the extraction, from the basin 4, of the assembly formed by the bowl 7, the working tool 6 and the cover 8, when said cover is in its unlocked condition.

Thus, thanks to the hooking means, there is obtained an assembly forming a removable box. So as to facilitate its extraction and handling, the chute 9 for introduction of foodstuffs serves itself as the gripping member. The box thus constituted can be placed on the working plane or else brought to the sink for its cleaning either as a unit or disassembled.

According to a first embodiment (not shown), the mutual hooking means 17 are formed by at least one recess and a beak which are arranged respectively on the upper edge 23 of the bowl 7 and on the edge of the cover 8 and which come into engagement by resilient snap fitting one with the other. By way of example, the recess could be a groove and the beak a rib, or a series of corresponding beaks and recesses.

According to another embodiment and as shown in the drawings, the locking/unlocking device is of the bayonet type, and to this end the upper edge 10 of the basin 4 has at least two cutouts 18 extending downwardly and preferably diametrically opposed and in each of which opens a transverse groove 19 extending about a certain angular distance.

To obtain the bayonet function, the two grooves 19 are open into the cutouts 18 in the same direction of rotation about the axis XX'. Moreover, the cover 8 comprises on its peripheral edge 20 two preferably diametrically opposed tongues 21, extending inwardly and adapted to be inserted respectively in the cutouts 18 and each carrying a lug 22 adapted to make slidable contact with the corresponding groove 19 of the upper edge 10 of the basin 4.

In this embodiment, the bowl 7 comprises on its upper edge 23 two radial tongues 24, preferably diametrically opposed and adapted to be inserted respectively in the cutouts 18 and each carrying a hook 25 adapted to come into engagement with a hooking member 26 of a hooking member pair carried by the cover 8, said hooks 25 and said hooking members 26 thereby constituting the mutual hooking means 17.

Figure 2:
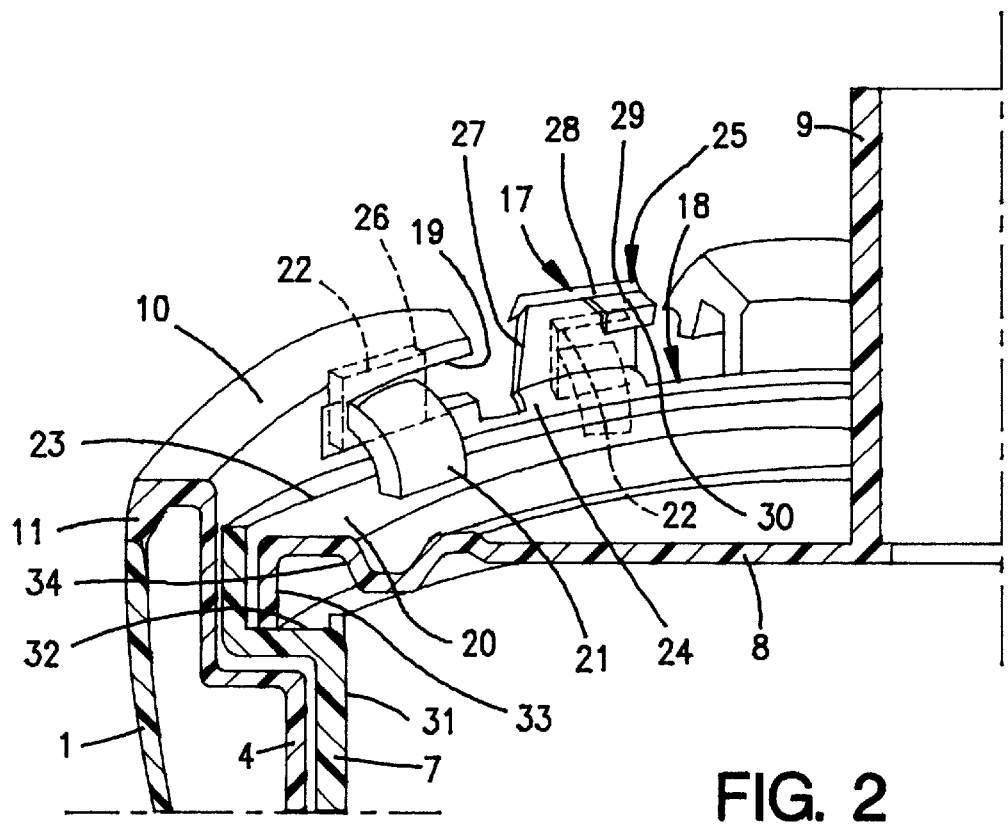
FIG. 2 is an enlarged schematic perspective view of a detail of a locking/unlocking device and the mutual securement means, according to the invention.
Figure 3:
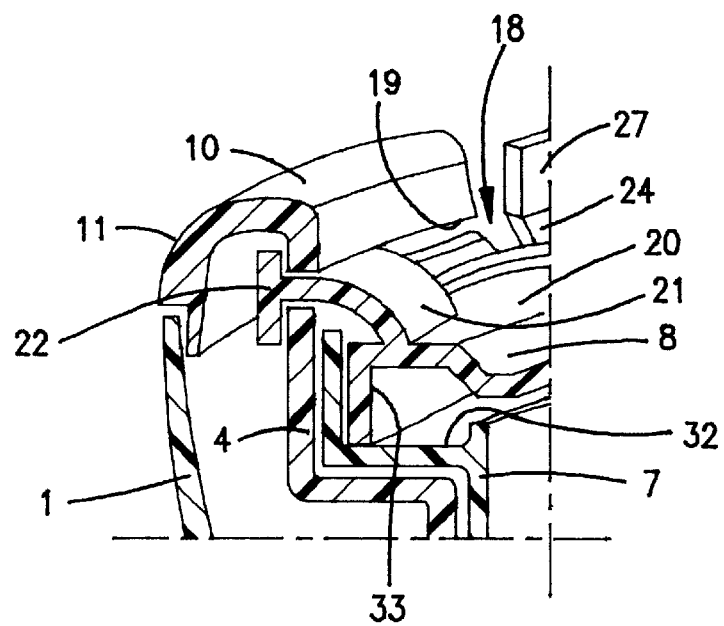
FIG. 3 is a fragmentary vertical cross-sectional view on the line III/III of FIG. 1.

As is of course shown in FIG. 2, the radial tongues 24 each have at their outer end a wing 27 directed upwardly and carrying on a portion of its upper edge 28 a horizontal appendage 29 and having a narrow flange 30, said appendage and said flange constituting the hook 25.

Figure 4:
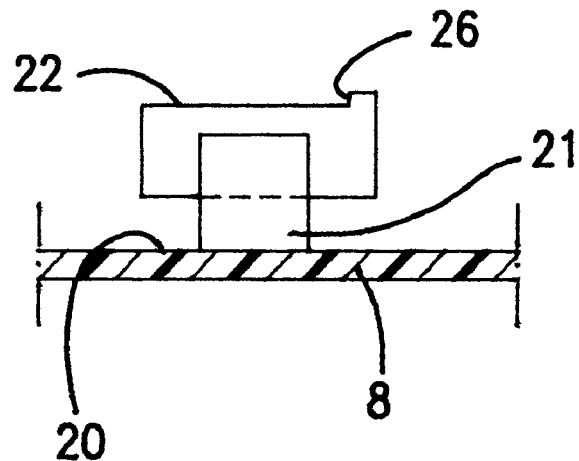
FIG. 4 is an elevational view of a detail of a tongue of the locking/unlocking device.

According to an interesting characteristic of the invention, the depth of the grooves 18 is such that the radial tongues 24 project beyond the lower portion of the grooves 19, whilst the lugs 22 and the hooking members 26 together constitute a single piece (see FIG. 4) which slides as well in the corresponding groove 19 as on the corresponding radial tongue 24 to come into hooking engagement on the hook 25.

Figure 5:
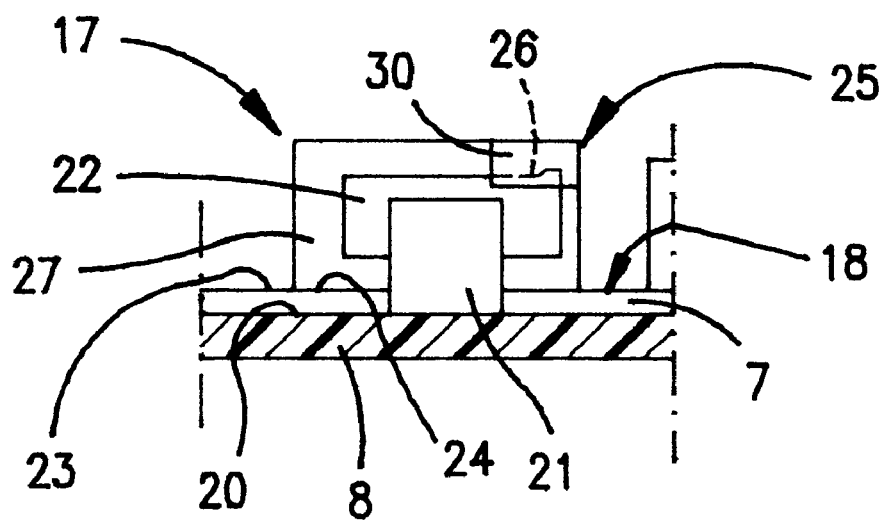
FIG. 5 shows in elevation details of the mutual securement means.

In a preferred embodiment, each cutout 18 has an angular dimension such that the single piece forming the lugs 22 and the hooking members 26 can occupy, by rotation about the axis X—X', at least two positions, apart from the position locked in the groove shown in full lines in FIG. 2, either an unlocked position, or an end unlocked and hooked position shown in broken lines on the same figure and in full lines on FIG. 5.

Moreover, the cutouts 18 each have a depth such that the tongues 24 rest on the bottom of said cutouts and are thus immobilized in rotation, whilst the grooves 19 have their opening located at a distance from the bottom of the grooves above the tongues 24 and at the same level as the lugs 22.

So as to ensure particularly good sealing between the bowl 7 and the cover 8, said bowl has on the upper region of its internal wall 31 a peripheral shoulder 32, and the cover 8 has a descending edge 33 which comes into engagement with the bowl and whose free end 34 bears in practically sealed relationship on the shoulder 32.

The operation of the juicer will now be described on the assumption that the housing 1 contains neither the bowl nor the filter nor its cover.

In a first phase, the user places the bowl 7 into the basin 4 whilst simultaneously placing the spout 13' through the openings P1, P2 and the tongues 24 into the cutouts 18, then couples the filter 6 to the shaft 3 of the motor group 2. In a second phase, he emplaces the cover 8 by nesting the downwardly extending flange 33 into the bowl 7 and the tongues 21 into the cutouts 18. Then in a third phase, he impresses by means of the chute 9 a rotation on the cover 8 about the axis X—X', this time in a counterclockwise direction, to cause said tongues to slide in the grooves 19. In the course of this movement, the tongues 24 of the cover 8 are immobilized in rotation in the grooves 18 and the cover 8 slides within the bowl 7. This latter phase ensures not only the closure of the bowl and its maintenance in the basin 4, but also permits the start up of the motor group 2 by closing a switch (not shown) disposed in the bottom of at least one groove 19. Thus, the single piece 23-26 actuates the switch when it is in locked position.

Once the operation of centrifugation is over, the user grips the chute 9 and twists it which tends to turn the cover 8 in a clockwise direction to bring the tongues 21 and hence the lugs 22 and the hooking members 23 into intermediate unlocked position. Then, moving beyond this position by still turning in the clockwise direction, he brings the hooking member 26 into the end unlocked and hooked position in which it comes into engagement with the hook 25.

As soon as hooking takes place, the user, by exerting a tractive force upwardly on the chute 9, proceeds to the extraction of the box constituted by the bowl, the filter and the cover.

It will be understood that thereafter, by a simple opposite direction in the counterclockwise direction, the user proceeds to disassemble the box, cover, filter and bowl.

It should also be noted in the example described, that the user has the opportunity to raise the cover alone when the lugs 22 and the hooking members 26 occupy the intermediate unlocked position.

So as to ensure protection against dust when the apparatus is not used, there is provided (FIG. 1) secured to the cover 8 a countercover 35 which has a hole 36 corresponding to the chute 9 and which fits over this chute to come to rest on the upper edge 12 of the housing 1.

What is claimed is:

1. In a fruit or vegetable juicer comprising:
    a housing enclosing a motor group having an output shaft extending along an axis, said output shaft projecting into a basin secured to the housing, said output shaft driving in rotation a working tool disposed in a bowl, said bowl being movably mounted within the basin and covered by a cover, said cover having a chute for the introduction of foodstuff and a locking/unlocking device ensuring maintenance of the bowl in the basin when the cover is in a locked condition; the improvement wherein the bowl and the cover also comprise mutual hooking means permitting removal from the basin of an assembly comprised of the bowl, the working tool and the cover, when the cover is in an unlocked condition.

2. The juicer according to claim 1, wherein the mutual hooking means are formed by a recess and at least one beak, said recess and beak being arranged respectively on an upper edge of the bowl and on an edge of the cover, and said recess and beak being structured and arranged to come into resilient snap engagement with each other.

3. The juicer according to claim 1, wherein the locking/unlocking device is of the bayonet type, the basin has an upper edge which comprises at least two cutouts extending downwardly and in each of which opens a transverse groove; the cover comprising two tongues adapted to be inserted in the cutout, and each tongue carrying a lug adapted to slide in a corresponding groove of the upper edge of the basin.

4. The juicer according to claim 3, wherein the bowl comprises on its upper edge at least two tongues adapted to be inserted in the cutouts, each tongue carrying a hook adapted to come into engagement with a hooking member carried by the cover, said hooks and said hooking members carried by the cover constituting the mutual hooking means.

5. The juicer according to claim 4, wherein the lugs and the hooking members together constitute a single piece.

6. The juicer according to claim 5, wherein each cutout has an angular extent such that the single piece forming the lugs and the hooking members can occupy by rotation about the axis at least two positions, beyond the locked position in the groove, namely either an unlocked position, or an end unlocked and hooked position.

7. The juicer according to claim 6, wherein the motor group comprises a starting switch disposed in the bottom of at least one groove, said switch adapted to be actuated when the single piece is in a locked position.

8. The juicer according to claim 6, wherein the cutouts each have a depth such that the tongues rest on the bottom of said cutouts and are thus immobilized in rotation, said grooves having their outlet located at a distance from the bottom of the cutouts above the tongues and at the same level as the lugs.

9. The juicer according to claim 1, wherein the bowl has in an upper region of its internal wall a peripheral shoulder, and the cover has a descending flange which comes into engagement with the bowl, said flange having a free end which bears in substantially sealed relation on said shoulder.

10. The juicer according to claim 1, wherein the chute for introduction of the foodstuff is structured and arranged to serve as a gripping member during removal of the assembly comprised of the bowl, the working tool and the cover.

11. The juicer according to claim 1, wherein the housing has a tubular shape and is comprised of a lower region and an upper region, the lower region comprising the motor group and the upper region carrying the basin, an upper edge of the basin having a flange structured and arranged to come into engagement with an upper edge of the housing, said basin and the housing having in their upper region first registering openings for discharge of pulp arranged in the bowl, and in the lower region of the basin an intermediate region of the housing second registering openings for passage of a spout for discharging juice disposed in the bottom of the bowl.

* * * * *

UNITED STATES PATENT AND TRADEMARK OFFICE
CERTIFICATE OF CORRECTION

PATENT NO. : 5,896,812
DATED : April 27, 1999
INVENTOR(S) : Antonio BASORA SANJUAN et al.

It is certified that error appears in the above-indentified patent and that said Letters Patent is hereby corrected as shown below:

On the title page, in Item [19], change "Basora et al." to --Basora Sanjuan et al.--.

On the title page, in Item [75], change the first inventor's name from "Sanjuan Antonio Basora" to --Antonio Basora Sanjuan--.

Signed and Sealed this

Fifteenth Day of August, 2000

Attest:

Q. TODD DICKINSON

Attesting Officer     Director of Patents and Trademarks